United States Patent
Diamond et al.

(10) Patent No.: US 12,397,706 B1
(45) Date of Patent: Aug. 26, 2025

(54) SYSTEMS AND METHODS FOR ACTUATING VEHICLE LIGHTS BASED ON EXTERNAL LIGHT SHOW

(71) Applicant: Ford Global Technologies, LLC, Dearborn, MI (US)

(72) Inventors: Brendan Diamond, Grosse Pointe, MI (US); Keith Weston, Canton, MI (US); John Robert Van Wiemeersch, Novi, MI (US); Anthony Maraldo, Southgate, MI (US); Andrew Brown, Royal Oak, MI (US); Stuart C. Salter, White Lake, MI (US)

( * ) Notice: Subject to any disclaimer, the term of this patent is extended or adjusted under 35 U.S.C. 154(b) by 62 days.

(21) Appl. No.: 18/624,768

(22) Filed: Apr. 2, 2024

(51) Int. Cl.
- *B60Q 1/50* (2006.01)
- *B60Q 5/00* (2006.01)
- *B60Q 1/00* (2006.01)

(52) U.S. Cl.
CPC ............... *B60Q 1/50* (2013.01); *B60Q 5/005* (2013.01); *B60Q 1/0023* (2013.01); *B60Q 2300/14* (2013.01); *B60Q 2300/21* (2013.01); *B60Q 2300/314* (2013.01); *B60Q 2300/45* (2013.01); *B60Q 2900/50* (2022.05)

(58) Field of Classification Search
CPC . B60Q 1/50; B60Q 2300/45; B60Q 2300/314
USPC ....................................................... 362/487
See application file for complete search history.

(56) References Cited

U.S. PATENT DOCUMENTS

| | | | |
|---|---|---|---|
| 8,380,394 B1* | 2/2013 | Snodgrass | B60G 17/018 |
| | | | 701/37 |
| 9,731,645 B1 | 8/2017 | Taleb-Bendiab | |
| 10,574,757 B2 | 2/2020 | Rosen et al. | |
| 2018/0370466 A1* | 12/2018 | Murata | B60R 21/017 |
| 2024/0025336 A1 | 1/2024 | Pendikatla et al. | |
| 2024/0083374 A1* | 3/2024 | Ma | B60S 1/08 |

OTHER PUBLICATIONS

Wojciech Lewandowski, et. al., Adaptive Lighting Systems and the Method of Implementing Dynamically Adjustable On-Demand Strategies—Conclusions From Research, Technical Transactions, e2022014. https://doi.org/10.37705/TechTrans/e2022014, Dec. 20, 2022, pp. 1-19.

Walterpack, What is Dynamic Lighting?, https://www.walterpack.com/en/what-is-dynamic-lighting/, 2022, pp. 1-3.

Peter A. Kara, et. al., How I Met Your V2X Sensor Data: Analysis of Projection-Based Light Field Visualization for Vehicle-To-Everything Communication Protocols and Use Cases, MDPI Sensors 2023, 23, 1284. https://doi.org/10.3390/s23031284, Jan. 22, 2023, pp. 1-33.

* cited by examiner

*Primary Examiner* — Christopher M Raabe
(74) *Attorney, Agent, or Firm* — Frank Lollo; Eversheds Sutherland (US) LLP (57) ABSTRACT

A vehicle including a detection unit and a processor is disclosed. The detection unit may be configured to capture inputs associated with an external light being illuminated in proximity to the vehicle. The processor may be configured to obtain the inputs from the detection unit, and determine an illumination characteristic associated with the external light based on the inputs obtained from the detection unit. The processor may further actuate a vehicle light to illuminate based on the illumination characteristic.

19 Claims, 6 Drawing Sheets

SYSTEMS AND METHODS FOR ACTUATING VEHICLE LIGHTS BASED ON EXTERNAL LIGHT SHOW

FIELD

The present disclosure relates to systems and methods for actuating vehicle lights based on an illumination pattern of an external light show.

BACKGROUND

It is known that many users decorate their homes with lights during festivals (e.g., during Christmas) or when the users may be celebrating an event or having a get-together/party. Users typically decorate their homes in innovative ways to enhance the lighting's visual appeal and/or the home façade appearance. For example, some users decorate their parked vehicles to augment the home decoration. While such measures may assist the users to some extent, the users may desire additional means to innovatively enhance the home decoration.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle that may be configured to actuate one or more vehicle lights based on a light show associated with external lights that may be illuminated in proximity to the vehicle. In an exemplary aspect, the external lights may be located or disposed on adjacent to a building (e.g., a user's home), and the vehicle may be parked in proximity to the building. The vehicle may obtain images of the external lights, and may determine an illumination characteristic associated with the external lights based on the obtained images. The illumination characteristic may be, for example, an illumination duty cycle, an illumination pattern, light color(s), and/or the like, associated with the external lights. Responsive to determining the illumination characteristic, the vehicle may actuate the vehicle lights to illuminate based on the determined illumination characteristic. In some aspects, the vehicle may cause the vehicle lights to emulate the external lights, or may cause the vehicle lights to complement the external lights. In this manner, the vehicle may enable the light show associated with the external lights to extend to the vehicle lights.

In further aspects, the vehicle may include one or more projectors, and may cause the projector to project a light pattern or a predefined message onto an external surface (e.g., a home wall) based on the illumination characteristic associated with the external lights. The vehicle may further include one or more speakers, and may cause the speaker to output a sound pattern that matches with the illumination characteristic associated with the external lights. In some aspects, the vehicle may be configured to customize the illumination pattern associated with the vehicle lights and/or the projector, or the sound pattern associated with the speaker based on user inputs or preferences provided by a user.

The vehicle may be further configured to optimize vehicle's energy consumption while actuating the vehicle lights based on the illumination characteristic associated with the external lights. For example, the vehicle may actuate the vehicle lights when a state of charge (SoC) level associated with a vehicle battery may be greater than a predefined SoC threshold or when the vehicle may be connected or interfaced to a charger. The vehicle may further actuate only a subset of vehicle lights (and not all the vehicle lights) when the SoC level may be low. The vehicle may further actuate the vehicle lights based on a time of a day, between user-specified times, and/or ambient brightness level. The vehicle may additionally actuate the vehicle lights only when a user or another vehicle may be present in proximity to the home, and may not actuate the vehicle lights when no one may be present to view the light show.

In additional aspects, the vehicle may actuate one or more trailer lights associated with a trailer attached to the vehicle based on the illumination characteristic associated with the external lights, in the same manner as the vehicle actuates the vehicle lights.

The present disclosure discloses a vehicle that enables a user to extend a home-based light show to vehicle lights. The vehicle causes the vehicle lights to emulate the external lights, so that the user may decorate the user's home in an innovative manner. The vehicle further implements one or more different energy optimization measures to ensure that the vehicle's energy consumption is optimized and not unnecessarily consumed to illuminate the vehicle lights.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
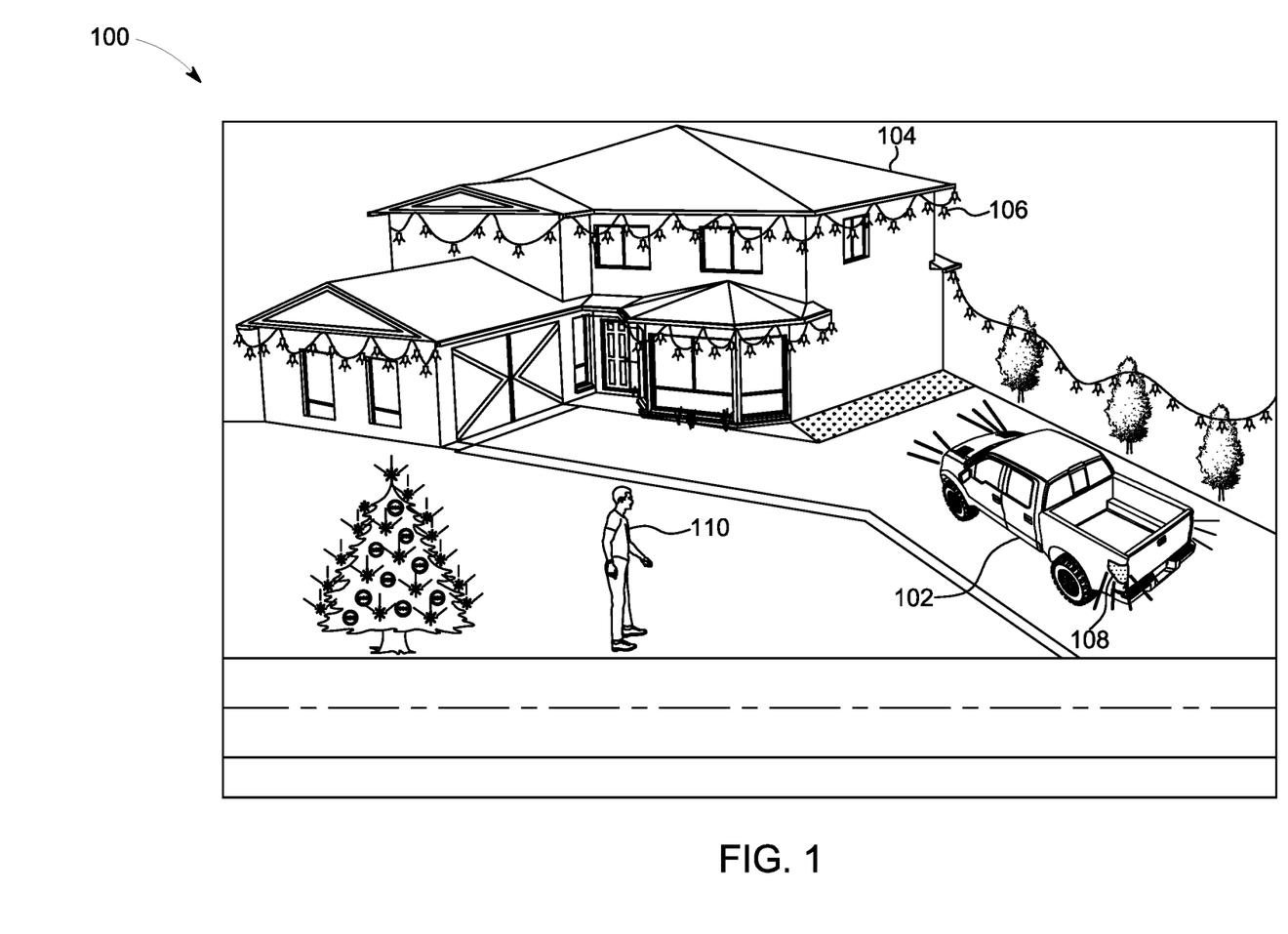
FIG. 1 depicts an environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102 that may be parked or be stationary in proximity to a building 104. In some aspects, the building 104 may be a home associated with an owner of the vehicle 102, and the vehicle 102 may be parked outside the home. Hereinafter, in the present disclosure, the building 104 is referred to as home 104. In other aspects, the building 104 may be a user office (or user business place) or any festival site.

The vehicle 102 may take the form of any passenger or commercial vehicle such as a car, a work vehicle, a crossover vehicle, a truck, a van, a minivan, a taxi, a bus, etc. The vehicle 102 may be a manually driven vehicle, or may be configured to operate in a partially/fully autonomous mode, and may include any powertrain such as a gasoline engine, one or more electrically-actuated motor(s), a hybrid system, etc.

In an exemplary aspect, the home 104 may be decorated with one or more external lights 106 (e.g., celebration or party lights) that may be disposed/placed on one or more exterior walls of the home 104, home garden, artefacts placed at a home exterior portion, and/or the like. The homeowner may have disposed/placed the lights 106 at the home exterior portion to celebrate a special occasion, e.g., a party, a wedding, Christmas or any other festival, and/or the like. In some aspects, the lights 106 may be getting illuminated at a predefined illumination duty cycle, in a predefined illumination pattern, and/or may be emitting one or more predefined light colors. In the present disclosure, the illumination duty cycle, the illumination pattern, the light color(s), and/or other characteristics associated with the lights 106 are collectively referred to as "illumination characteristic" of the lights 106.

In some aspects, the vehicle 102 may be configured to determine (e.g., by using Artificial Intelligence/Machine Learning (AI/ML) based image processing algorithms) the illumination characteristic associated with the lights 106 based on inputs obtained from a vehicle detection unit (e.g., exterior vehicle cameras), and cause one or more vehicle lights 108 to illuminate (or actuate the vehicle lights 108) based on the determined illumination characteristic. The vehicle lights 108 may be vehicle's interior lights and/or exterior lights. In some aspects, the vehicle 102 may cause the vehicle lights 108 to emulate and synchronize with the illumination of the lights 106 based on the determined illumination characteristic. For example, the vehicle 102 may cause the vehicle lights 108 to illuminate with the same duty cycle, in the same illumination pattern and/or in the same colors as the lights 106. In this manner, the vehicle 102 may enable the homeowner to "extend" the home decoration or celebration lights to the vehicle 102, thereby facilitating the homeowner to decorate the home 104 in a highly creative and innovative way. In this case, the vehicle 102 may act as a part of the home's decoration, when the home 104 may be decorated with the lights 106.

In other aspects, the vehicle 102 may cause the vehicle lights 108 to "complement" the lights 106, and may not completely emulate the illumination characteristic associated with the lights 106. For example, in this case, the vehicle 102 may cause the vehicle lights 108 to illuminate in a first color when the lights 106 may be illuminating in a second color (which may be different from the first color), and/or may switch ON the vehicle lights 108 when the lights 106 may be dark and then switch OFF the vehicle lights 108 when the lights 106 may be illuminated.

In some aspects, the vehicle 102 may cause the vehicle lights 108 to illuminate based on the illumination characteristic associated with the lights 106 when the vehicle 102 may be parked or stationary in proximity to the home 104, and may not cause the vehicle lights 108 to illuminate when the vehicle 102 may be in motion.

Further, in some aspects, the vehicle 102 may cause the vehicle lights 108 to illuminate when a count of users (e.g., a user 110) walking in proximity to the home 104 and/or a count of vehicles (not shown) traveling past the home 104 over a predefined time duration (e.g., 1-2 minutes) may be greater than a predefined count threshold. Stated another way, the vehicle 102 may cause the vehicle lights 108 to illuminate when a rate of users and/or vehicles moving past the home 104 may be greater than a threshold, or when users/vehicles may be detected in proximity to the home 104. In some aspects, the vehicle 102 may implement the vehicle light illumination strategy or limitation, as described above, to conserve vehicle energy that may be consumed to illuminate the vehicle lights 108. Specifically, the vehicle 102 may conserve the vehicle energy by not illuminating the vehicle lights 108 when no one may be present in proximity to the vehicle 102 to view the illuminated vehicle lights 108.

In some aspects, the vehicle 102 may implement additional measures to conserve the vehicle energy while illuminating the vehicle lights 108 based on the illumination characteristic associated with the lights 106. For example, the vehicle 102 may illuminate the vehicle lights 108 when the vehicle 102 may be connected with or interfaced to an Electric Vehicle (EV) charger (e.g., when the vehicle 102 may be an EV), or when a vehicle battery state of charge (SoC) may be greater than a predefined SoC threshold. If the vehicle 102 is an internal combustion engine (ICE) vehicle, the vehicle 102 may automatically remote start or auto-start when the SoC level may be low (e.g., lower than the predefined SoC threshold). The vehicle 102 may further adjust power consumption and/or illumination brightness associated with the vehicle lights 108 based on the SoC and/or battery's energy capacity. As an example, the vehicle 102 may reduce the vehicle light brightness when the SoC may be low (e.g., lower than a predefined brightness SoC threshold), and may illuminate the vehicle lights 108 at a standard or high brightness level when the SoC may be high (e.g., higher than the predefined brightness SoC threshold).

In additional aspects, the vehicle 102 may illuminate only a subset of vehicle lights 108 (and not all the vehicle lights 108) when the SoC may be low, to conserve the vehicle energy. The vehicle 102 may further control the vehicle light illumination based on a time of the day, an ambient brightness level, and/or the like. For example, the vehicle 102 may not cause the vehicle lights 108 to illuminate during afternoon time duration and/or when the ambient brightness level may be high (e.g., when it may be a sunny day), and may cause the vehicle lights 108 to illuminate during evening or night time durations. The vehicle 102 may implement additional similar power conservation measures to conserve the vehicle energy while illuminating the vehicle lights 108. Examples of such power conservation measures are described later in the description below.

Although the description above describes an aspect where the vehicle 102 causes the vehicle lights 108 to illuminate based on the illumination characteristic associated with the lights 106, the present disclosure is not limited to such an aspect. In additional aspects, the vehicle 102 may cause one or more vehicle interior or exterior projectors (shown as projector 240 in FIG. 2) to project a light pattern or a predefined message on an exterior surface (e.g., a home wall) based on the illumination characteristic associated with the lights 106. For example, the vehicle projector may project the light pattern or the predefined message on the home wall in the same color and/or the illumination pattern as the lights 106.

The vehicle 102 may further cause one or more vehicle speakers (shown as speaker 242 in FIG. 2) to output sound or music in a sound pattern that may be based on (e.g., synchronized with) the illumination characteristic associated with the lights 106. In some aspects, the vehicle 102 may additionally control/adjust the illumination pattern associated with the vehicle lights 108 and/or the output sound pattern associated with the vehicle speakers based on user inputs or preferences associated with a user (who may be the home owner or a spectator viewing the light show associated with the lights 106 and/or the vehicle lights 108).

The vehicle 102 may be further configured to control actuation and illumination of one or more trailer lights (shown as trailer lights 402 in FIG. 4) associated with a trailer (shown as trailer 404 in FIG. 4) that may be electrically and communicatively connected with the vehicle 102, based on the illumination characteristic associated with the lights 106 in the similar manner as the vehicle 102 controls actuation/illumination of the vehicle lights 108.

Further vehicle details are described below in conjunction with FIG. 2.

The vehicle 102 and/or the home owner/user implement and/or perform operations, as described here in the present disclosure, in accordance with the owner manual and safety guidelines. In addition, any action taken by the home owner based on notifications provided by the vehicle 102 should comply with all the rules specific to the location and operation of the vehicle 102 (e.g., Federal, state, country, city, etc.). The notifications, as provided by the vehicle 102, should be treated as suggestions and only followed according to any rules specific to the location and operation of the vehicle 102.

Figure 2:
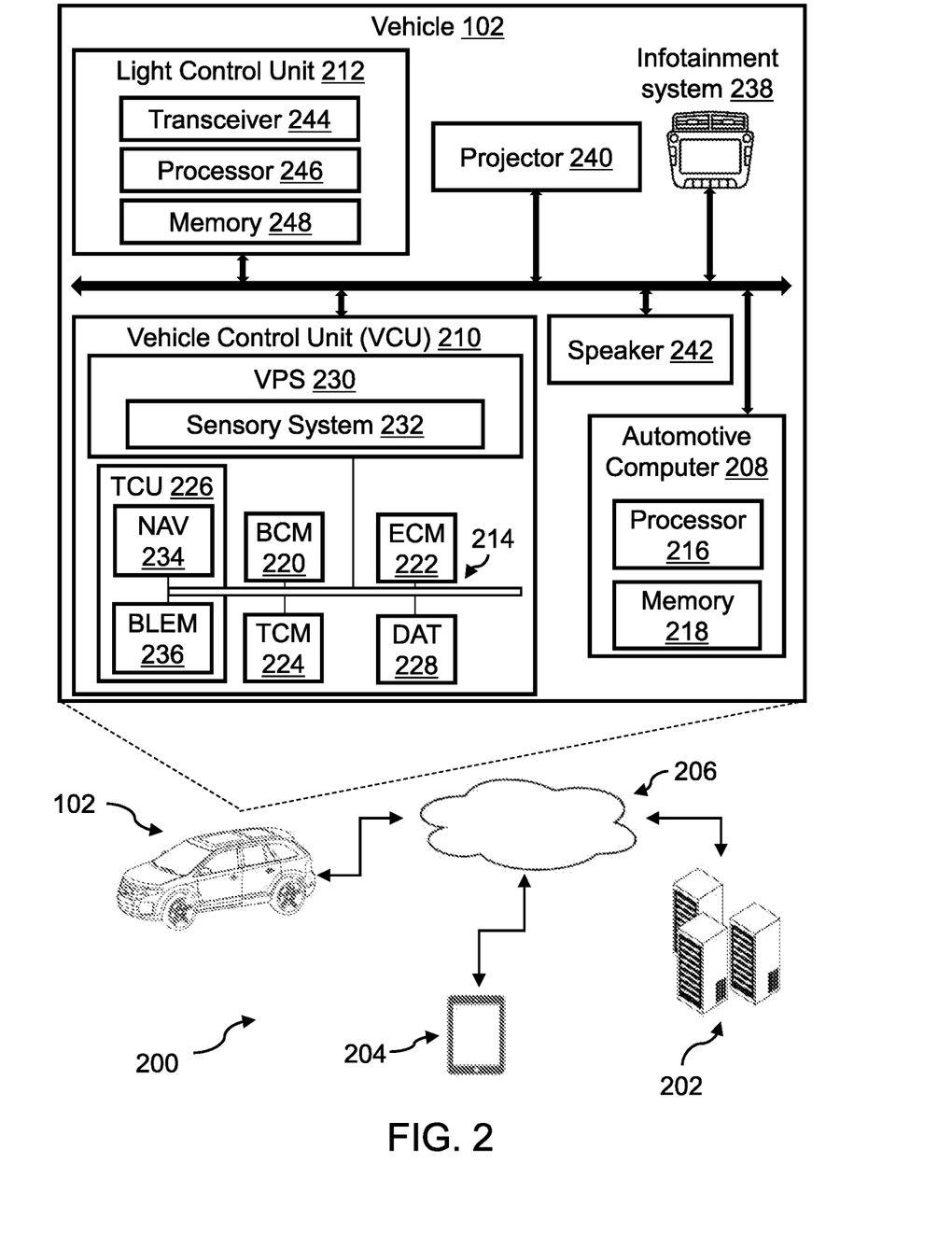
FIG. 2 depicts a block diagram of a system to control an operation of a vehicle light in accordance with the present disclosure.

FIG. 2 depicts a block diagram of a system 200 to control an operation of the vehicle lights 108 in accordance with the present disclosure. While describing FIG. 2, references will be made to FIGS. 3, 4 and 5.

The system 200 may include the vehicle 102, one or more servers 202 (or a server 202), a user device 204 communicatively coupled with each other via one or more networks 206. The server 202 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet. In further aspects, the server 202 may provide AI/ML based image processing algorithms to the vehicle 102, which may enable the vehicle 102 to analyze images captured by one or more vehicle interior and/or exterior cameras and perform one or more actions based on the image analysis. For example, the vehicle 102 may determine the illumination characteristic associated with the lights 106, determine a user and/or a vehicle presence in proximity to the vehicle 102, and/or the like based on the image analysis. The server 202 may provide the AI/ML based image processing algorithms to the vehicle 102 at a predefined frequency, or when the vehicle 102 transmits a request to the server 202 to obtain such algorithms.

The user device 204 may be associated with the home/vehicle owner, and may be, for example, a mobile phone, a key fob, a computer, a laptop, tablet, a smart wearable device, or any other device with communication capabilities.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a light control unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a light control program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 202), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or a "detection unit"). The vehicle sensory system 232 may include one or more vehicle sensors including, but not limited to, a Radio Detection and Ranging (radar) sensor configured for detection and localization of objects inside and outside the vehicle 102 using radio waves, sitting area buckle sensors, sitting area sensors, a Light Detecting and Ranging (lidar) sensor, door sensors, proximity sensors, temperature sensors, wheel sensors, ambient weather sensors, vehicle internal and external cameras, one or more rain sensors, capacitive moisture sensors, etc. In some aspects, the vehicle sensory system 232 may be configured to capture inputs (via the vehicle interior and exterior cameras) associated with one or more external lights that may be illuminated in proximity to the vehicle 102. The external lights may be, for example, the lights 106 that may be located at the home 104 (as described above in conjunction with FIG. 1), and the inputs associated with the external lights may be the images of the lights 106.

In some aspects, the VCU 210 may control vehicle operational aspects and implement one or more instruction sets received from the user device 204, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob, not shown in FIG. 2), computers, and modules. The TCU 226 may be in communication with the ECUs 214 by way of a bus. The bus may be wired or wireless.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 204, the server(s) 202, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), audio system(s), speakers, wipers, door locks and access control, and various comfort controls. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI)). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may be further configured to receive user instructions via the touchscreen interface portion, and/or display notifications, navigation maps, etc. on the touchscreen interface portion.

The vehicle 102 may further include one or more projectors 240 (or a projector 240, which may be installed in a vehicle headlamp) and one or more speakers 242 (or a speaker 242). The projector 240 may be configured to project a light pattern or a predefined message onto an external surface, e.g., a home wall associated with the home 104. Further, the speaker 242 may be configured to output sound/music based on user inputs, and/or command signals obtained from the automotive computer 208, the VCU 210, and/or the unit 212.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 244, a processor 246, and a computer-readable memory 248.

The transceiver 244 may be configured to receive information/inputs from one or more external devices or systems, e.g., the user device 204, the server(s) 202, and/or the like via the network 206. For example, the transceiver 244 may receive the AI/ML based image processing algorithms from the server(s) 202 via the network 206. Further, the transceiver 244 may transmit notifications (e.g., alert/alarm signals) to the external devices or systems. In addition, the transceiver 244 may be configured to receive information/inputs from vehicle 102 components such as the infotainment system 238, the vehicle sensory system 232, and/or the like. Further, the transceiver 244 may transmit notifications (e.g., alert/alarm/command signals) to the vehicle 102 components such as the infotainment system 238, the BCM 220, the projector 240, the speaker 242, etc.

The processor 246 and the memory 248 may be the same as or similar to the processor 216 and the memory 218, respectively. In some aspects, the processor 246 may be an AI/ML based processor that may utilize the memory 248 to store programs in code and/or to store data for performing aspects in accordance with the disclosure. The memory 248 may be a non-transitory computer-readable medium or memory storing the light control code. In some aspects, the memory 248 may additionally store the AI/ML based image processing algorithms that the vehicle 102 may obtain from the server(s) 202.

In operation, the processor 246 may obtain inputs associated with the lights 106 from the vehicle sensory system 232 (or the detection unit). The inputs may be, for example, images of the lights 106 captured by the vehicle's exterior camera. In some aspects, the processor 246 may obtain the inputs associated with the lights 106 from the vehicle sensory system 232 when the vehicle 102 may be stationary or parked in proximity to the home 104. The processor 246 may determine that the vehicle 102 may be located at the home 104 by obtaining a real-time vehicle geolocation from the NAV receiver 234, and matching the real-time vehicle geolocation with the home's location (that may be pre-stored in the memory 248). Further, the processor 246 may determine that the vehicle 102 may be stationary or parked (i.e., not moving) based on inputs obtained from the VCU 210.

Responsive to obtaining the inputs associated with the lights 106 from the vehicle sensory system 232, the processor 246 may execute the AI/ML based image processing algorithm(s) stored in the memory 248, and determine the illumination characteristic associated with the lights 106 based on the inputs obtained from the vehicle sensory system 232. As described above in conjunction with FIG. 1, the illumination characteristic associated with the lights 106 may include an illumination duty cycle, an illumination pattern, a light color, and/or the like associated with the lights 106. In some aspects, the processor 246 may store the determined illumination characteristic in the memory 248.

Responsive to determining (and storing) the illumination characteristic associated with the lights 106, the processor 246 may transmit a command signal (via the BCM 220) to the vehicle lights 108 and actuate the vehicle lights 108 based on the determined illumination characteristic. The processor 246 may actuate the vehicle lights 108 based on the illumination characteristic associated with the lights 106 when the vehicle 102 may be parked or stationary in proximity to the home 104, and not when the vehicle 102 may be in motion.

As described above in conjunction with FIG. 1, in some aspects, the processor 246 may actuate the vehicle lights 108 such that the vehicle lights 108 emulate or synchronize the same illumination pattern/lighting behavior as the lights 106. In this manner, the vehicle 102 may become part of the "light show" that may be getting displayed at the home 104 via the lights 106. In other aspects, as described above in conjunction with FIG. 1, the processor 246 may actuate the vehicle lights 108 such that the vehicle lights 108 complement the lights 106.

Figure 3:
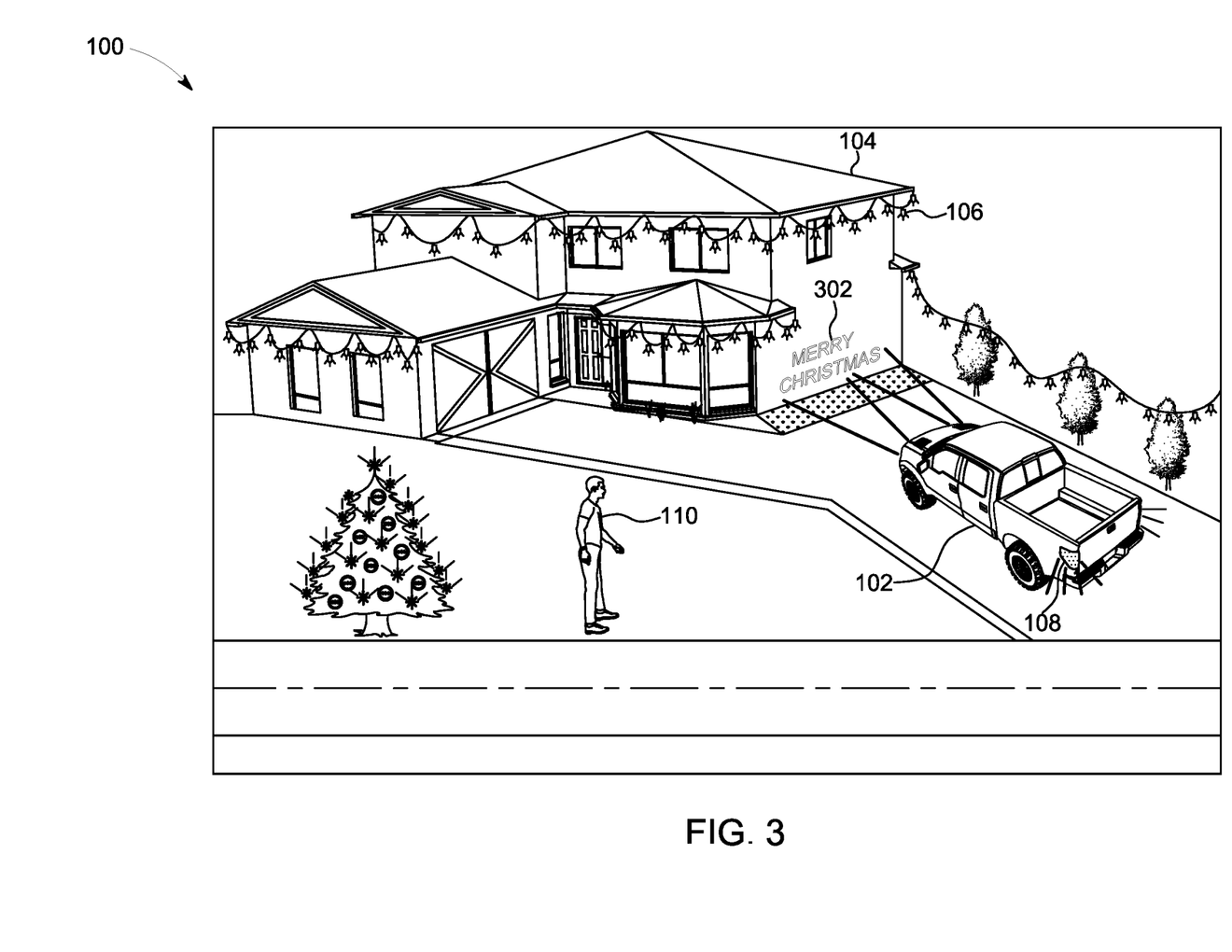
FIG. 3 depicts a snapshot of a vehicle projecting light on an exterior surface in accordance with the present disclosure.

In additional aspects, along with actuating the vehicle lights 108 as described above, the processor 246 may cause the projector 240 to project a predefined light pattern and/or a predefined message on an exterior/external surface (e.g., the home wall) based on the illumination characteristic associated with the lights 106, as shown in FIG. 3. FIG. 3 depicts an example snapshot where the vehicle 102 projects a predefined message 302 (e.g., "Merry Christmas") on the home wall based on the illumination characteristic associated with the lights 106. As an example, the processor 246 may cause the projector 240 to project the predefined message 302 in the same illumination pattern and/or color (or shape) as the lights 106.

In some aspects, the illumination pattern of the vehicle lights 108 and/or the projection pattern of the predefined message 302 from the projector 240 may also be customized based on user inputs or user preferences. In this case, the processor 246 may obtain, via the transceiver 244, the user inputs/preferences from the user device 204 and/or the infotainment system 238 (or the vehicle Human-Machine Interface (HMI)). In some aspects, the processor 246 may also obtain the user inputs based on the inputs obtained from the vehicle sensory system 232 (e.g., based on user images captured by the vehicle's interior and/or exterior cameras) and/or a vehicle microphone (not shown). In an exemplary aspect, the user inputs may be in the form of a user gesture, a voice command, and/or a user input received via the vehicle HMI. As an example, the user may command the vehicle lights 108 to illuminate with a certain user-preferred duty cycle and/or color by outputting a voice command, which may be captured by the vehicle microphone and transmitted to the processor 246. Responsive to obtaining the user inputs as described above, the processor 246 may cause the vehicle lights 108 to illuminate and/or the projector 240 to project the predefined message 302 based on the user inputs.

In further aspects, the processor 246 may cause the speaker 242 to output music or sound pattern based on the illumination pattern associated with the lights 106 and/or the obtained user inputs. As an example, the processor 246 may cause the speaker's volume to increase and decrease based on the illumination pattern of the vehicle lights 108 and/or the lights 106, and/or cause the speaker 242 to output a song based on the user inputs. In the latter case, the user requesting the song to be played by the speaker 242 may be the homeowner or a spectator viewing the light show associated with the vehicle lights 108 and/or the lights 106. The processor 246 may obtain the song request via the user device 204, the infotainment system 238, the vehicle microphone, vehicle-to-vehicle (V2V) communication, vehicle-to-infrastructure (V2I) communication, and/or the like. In additional aspects, the processor 246 may cause the vehicle lights 108 to illuminate and/or the projector 240 to project the predefined message 302 based on the melody or sound characteristics associated with the song requested by the user.

In yet another aspect, the processor 246 may cause (via the BCM 220 and/or vehicle's electric power take off) the vehicle body to move up and down, or a vehicle sitting area to move up and down to match the illumination pattern associated with the lights 106 and/or the sound pattern output by the speaker 242. Such an action may further enhance the visual appeal of the home decoration, and may enable an entertaining light show presentation for the spectators. In additional aspects, the processor 246 may match the vehicle engine's revolution per minute to the illumination characteristic associated with the lights 106 and/or the sound pattern output by the speaker 242. In further aspects, the processor 246 may periodically activate (via the BCM 220) snow or rain clearing measures to keep the sensors associated with the vehicle sensory system 232 and/or the vehicle lights clean/clear. In an exemplary aspect, in this case, the processor 246 may periodically activate vehicle wipers, heaters, vibration, vehicle body movement, and/or the like.

Further, as described above in conjunction with FIG. 1, the processor 246 may implement one or more measures to optimize vehicle energy consumption while illuminating the vehicle lights 108 and/or actuating the projector 240 and/or the speaker 242. For example, the processor 246 may actuate the vehicle lights 108 based on the illumination characteristic associated with the lights 106 when the processor 246 determines that a vehicle battery SoC level may be greater than a predefined SoC threshold or when the vehicle 102 may be connected to an EV charger. Stated another way, the processor 246 may not actuate the vehicle lights 108 when the vehicle battery SoC level may be less than the predefined SoC threshold, to conserve vehicle energy. In some aspects, when the vehicle 102 does not have a high-voltage (HV) battery or the HV battery has a low SoC level (e.g., lower than the predefined SoC threshold), the user may power the vehicle lights 108 by using an infrastructure powered electric cord. In some aspects, power may also be transferred to the vehicle 102 to illuminate the vehicle lights 108 via an inductive pad installed at the home's driveway and/or an energy source from another vehicle. When the vehicle 102 may be an internal combustion engine (ICE) vehicle or a hybrid electric vehicle (HEV), the vehicle engine may be pulled up or ignited periodically to charge the vehicle battery, to enable efficient vehicle light illumination.

As another example, to optimize vehicle's energy consumption, the processor 246 may illuminate only a subset of vehicle lights (and not all the vehicle lights 108) based on the real-time battery SoC level. For example, the processor 246 may actuate all the vehicle lights 108 when the battery SoC level may be greater than a first predefined SoC threshold, and may actuate only a subset of vehicle lights when the battery SoC level may be less than the first predefined SoC threshold but greater than a second predefined SoC threshold (which may be, e.g., equivalent to the predefined SoC threshold described above). In this case, the processor 246 may not illuminate any vehicle light when the real-time battery SoC level may be less than the second predefined SoC threshold.

As yet another example, the processor 246 may adjust the vehicle light power consumption and/or a vehicle light illumination brightness based on the real-time vehicle SoC level. For example, the processor 246 may dim the vehicle lights 108 or reduce vehicle light brightness when the real-time vehicle SoC level may be low (e.g., less than a predefined brightness SoC threshold). The processor 246 may further adjust the vehicle light power consumption and/or the vehicle light illumination brightness based on a usable energy capacity level associated with the vehicle battery.

As yet another example, the processor 246 may actuate/illuminate the vehicle lights 108 based on a time of day, between specific times (e.g., a user-preferred time duration of between 7 to 9 PM), and/or an ambient brightness level. For example, the processor 246 may not actuate/illuminate the vehicle lights 108 during daytime (when the ambient light may be bright), and may illuminate the vehicle lights 108 during nighttime.

As yet another example, the processor 246 may illuminate the vehicle lights 108 based on the illumination characteristic associated with the lights 106 when someone may be present in proximity to the vehicle 102/home 104 to view the light show, and may not illuminate the vehicle lights 108 when no one may be present to watch the light show. In this case, the processor 246 may determine a user and/or vehicle presence in proximity to the vehicle 102 or the home 104 (inside or outside the home 104) based on the inputs obtained from the vehicle sensory system 232 (e.g., the vehicle's exterior cameras), home based proximity sensors, motion detectors, and/or the like. Responsive to determining the user and/or vehicle presence in proximity to the vehicle 102 or the home 104, the processor 246 may determine a count of users walking in proximity to the vehicle 102/home 104 and/or a count of vehicles traveling in proximity to the vehicle 102/home 104 in a predefined time duration (e.g., 1-2 minutes). The processor 246 may actuate/illuminate the vehicle lights 108 when the count of users and/or the count of vehicles may be greater than a predefined count threshold. Stated another way, the processor 246 may illuminate the vehicle lights 108 when a rate of users/vehicles walking/traveling in proximity to the vehicle 102/home 104 may be greater than a threshold, and may not illuminate the vehicle lights 108 when the rate may be lesser than the threshold (to conserve vehicle's energy consumption).

Figure 4:
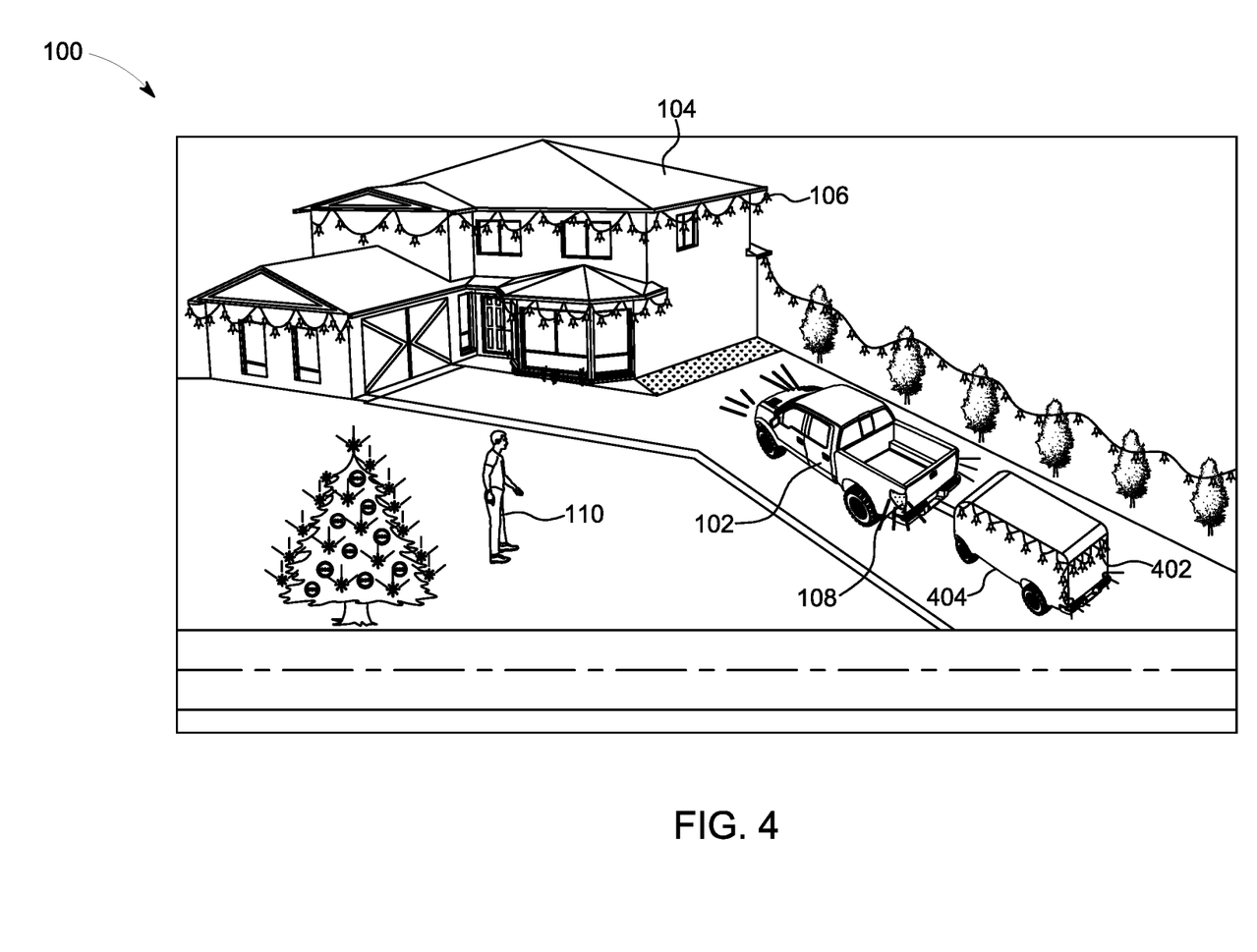
FIG. 4 depicts a snapshot of a trailer attached to a vehicle in accordance with the present disclosure.

Although the description above describes an aspect where the processor 246 actuates/illuminates the vehicle lights 108 based on the illumination characteristic associated with the lights 106, the present disclosure is not limited to such as aspect. In additional aspects, the processor 246 may be configured to cause one or more trailer lights 402 associated with a trailer 404 attached to the vehicle 102 to actuate based on the illumination characteristic associated with the lights 106, as shown in FIG. 4. The trailer lights 402 may be, for example, left and/or right turn signal lights, speed reduction lights, running lights, reverse lights, etc. In this manner, the processor 246 may enable the light show associated with the vehicle lights 108 and/or the lights 106 to extend to the trailer 404, which may be connected to the vehicle 102 via a 4-pin, 7-pin, or any other electrical connector. In further aspects, the processor 246 may modulate the 12V power supplied to the trailer 404 via the vehicle battery to control any exterior or accessory holiday lights that the user may have additionally installed on the trailer 404. The processor 246 may modulate the power supply by modulating the 12V power that may be getting transferred to the trailer connector. The use of the exterior or accessory holiday lights may enable the vehicle light show to be expanded to a larger display (for example, a side of a long tri-axle enclosed cargo trailer provides large surface area for a great light display). In some aspects, the vehicle 102 and/or the trailer 404 may be associated with the home owner. In other aspects, the vehicle 102 and/or the trailer 404 may not be associated with the home owner, but may instead be associated with a neighbor who may desire to participate in the festival lighting and may not have decorated own home.

Figure 5:
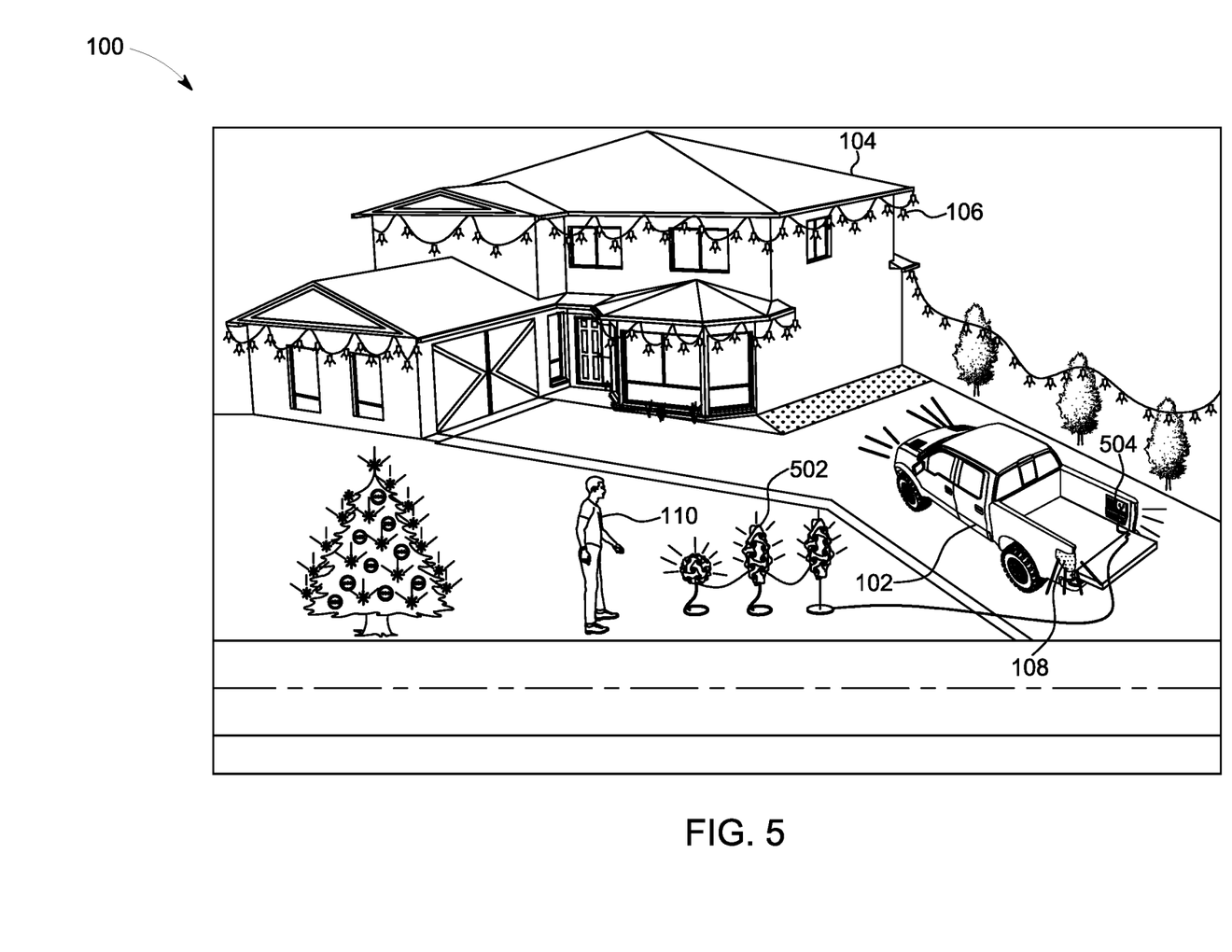
FIG. 5 depicts a snapshot of one or more lights connected to a vehicle power source in accordance with the present disclosure.

In further aspects, the processor 246 may actuate one or more additional lights 502 that may be attached to a vehicle's power source 504 (or a power pocket) based on the illumination characteristic associated with the lights 106 and/or user preferences, as shown in FIG. 5. In this case, the processor 246 may first obtain the user preferences associated with the illumination of the additional lights 502. The user preferences may be associated with a time duration when to actuate each light circuit (mapped to each outlet of the power source 504), the light pattern that may be implemented for the additional lights 502, the relative brightness of each light, the light color, and/or the like. Responsive to obtaining the user preferences, the processor 246 may cause the additional lights 502 to illuminate based on the user preferences. In this manner, the light show may be extended to additional lights, over and above the vehicle lights 108.

Figure 6:
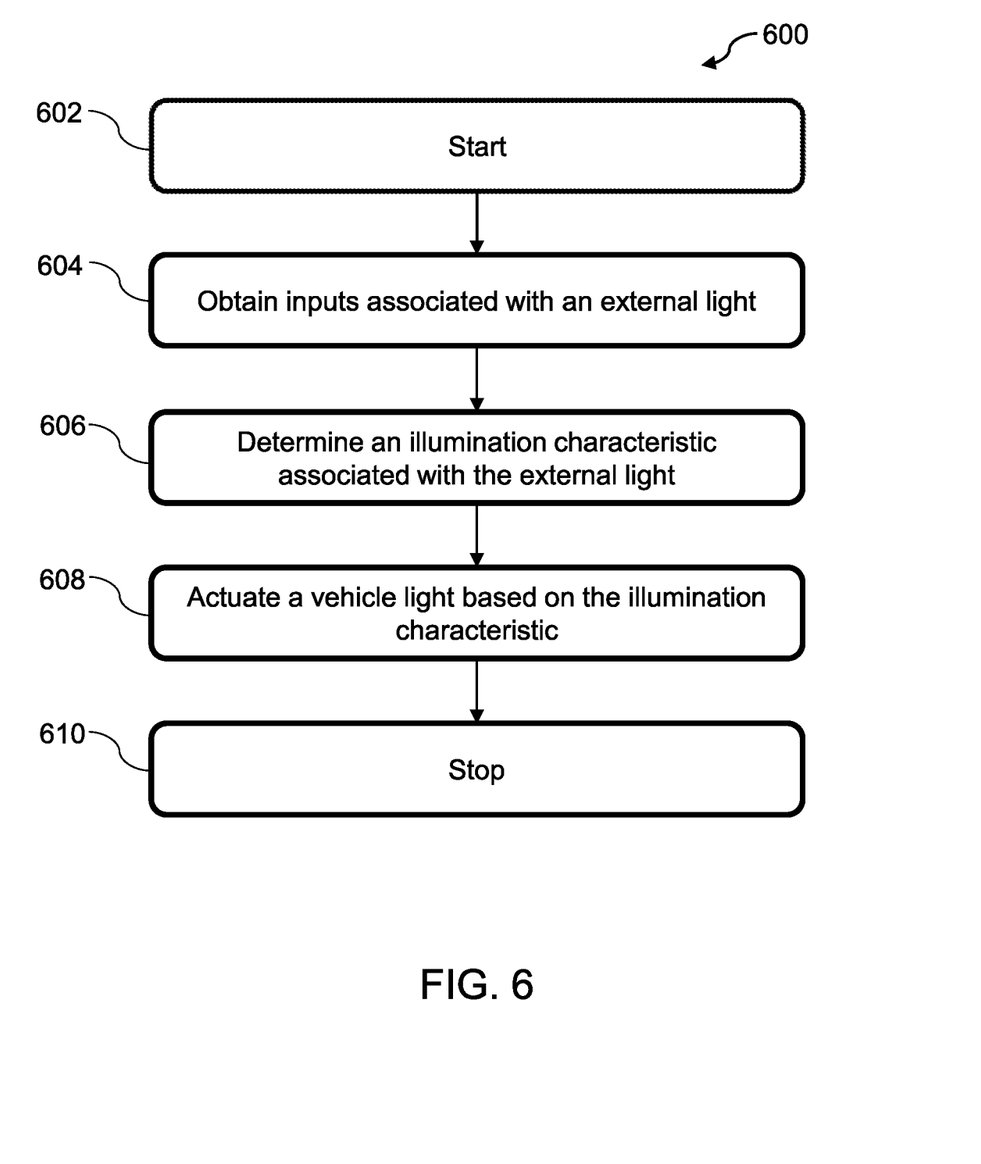
FIG. 6 depicts a flow diagram of a method to control an operation of a vehicle light in accordance with the present disclosure.

FIG. 6 depicts a flow diagram of a method 600 to control an operation of the vehicle lights 108 in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the processor 246, the inputs/images associated with the lights 106 from the vehicle sensory system 232. At step 606, the method 600 may include determining, by the processor 246, the illumination characteristic associated with the lights 106 based on the obtained inputs/images. At step 608, the method 600 may include actuating/illuminating, by the processor 246, the vehicle lights 108 based on the determined illumination characteristic associated with the lights 106, as described above in conjunction with FIGS. 1 and 2.

The method 600 may end at step 610.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a detection unit configured to capture inputs associated with an external light being illuminated in proximity to the vehicle; and
   a processor communicatively coupled with the detection unit, wherein the processor is configured to:
      obtain the inputs from the detection unit;
      determine an illumination characteristic associated with the external light based on the inputs obtained from the detection unit; and
      actuate a vehicle light based on at least a duty cycle of the illumination characteristic.

2. The vehicle of claim 1, wherein the external light is located on a wall of a user home, and wherein the processor is configured to activate the vehicle light when the vehicle is stationary or parked in proximity to the user home.

3. The vehicle of claim 1, wherein the detection unit comprises an exterior vehicle camera, and wherein the inputs associated with the external light comprise external images.

4. The vehicle of claim 1, wherein the vehicle light comprises at least one of an exterior vehicle light or an interior vehicle light.

5. The vehicle of claim 1, wherein the processor is further configured to:
   obtain a user input; and
   cause the vehicle light to illuminate based on the user input.

6. The vehicle of claim 5, wherein the user input comprises at least one of a user gesture, a user voice command, or an input received via a vehicle Human-Machine Interface (HMI).

7. The vehicle of claim 1, wherein the processor causes the vehicle light to emulate the illumination characteristic.

8. The vehicle of claim 1, wherein the processor causes the vehicle light to complement the illumination characteristic.

9. The vehicle of claim 1 further comprising a projector, wherein the processor is further configured to cause the projector to project a light pattern on an external surface based on the illumination characteristic.

10. The vehicle of claim 1 further comprising a speaker, wherein the processor is further configured to cause the speaker to output a sound pattern based on at least one of the illumination characteristic or user inputs.

11. The vehicle of claim 10, wherein the processor is further configured to cause a vehicle body to move up or down or a vehicle sitting area to move up or down to match the illumination characteristic.

12. The vehicle of claim 1, wherein the processor is further configured to:
   determine that a vehicle state of charge (SoC) is greater than a predefined SoC threshold or the vehicle is connected or interfaced to a charger; and
   actuate the vehicle light to illuminate based on the illumination characteristic when the vehicle SoC is greater than the predefined SoC threshold or the vehicle is connected or interfaced to the charger.

13. The vehicle of claim 12, wherein the processor is further configured to adjust at least one of a vehicle light power consumption or a vehicle light illumination brightness based on the vehicle SoC.

14. The vehicle of claim 1, wherein the processor is further configured to actuate the vehicle light based on at least one of a time of a day or an ambient brightness level.

15. The vehicle of claim 1, wherein the processor is further configured to:
- detect a count of users walking in proximity to the vehicle or a count of vehicles traveling in proximity to the vehicle in a predefined time duration; and
- actuate the vehicle light when the count of users or the count of vehicles exceeds a predefined count threshold.

16. The vehicle of claim 1, wherein the processor is further configured to cause a trailer light associated with a trailer attached to the vehicle to actuate based on the illumination characteristic.

17. The vehicle of claim 16, wherein the processor is further configured to modulate a power supply provided to the trailer from a battery of the vehicle, to cause the trailer light to actuate based on the illumination characteristic.

18. The vehicle of claim 1, wherein the processor is further configured to:
- obtain user preferences associated with illumination of one or more lights connected to a vehicle power source; and
- cause the one or more lights to actuate in an illumination pattern based on the user preferences.

19. A method to control an operation of a vehicle light, the method comprising:
- obtaining, by a processor, inputs associated with an external light being illuminated in proximity to a vehicle;
- determining, by the processor, an illumination characteristic associated with the external light based on the inputs; and
- actuating, by the processor, the vehicle light based on at least a duty cycle of the illumination characteristic.

* * * * *